United States Patent [19]

Kurei et al.

[11] 4,253,756
[45] Mar. 3, 1981

[54] THREE OPERATIONAL MODE CAMERA

[75] Inventors: Hiroshi Kurei, Kawagoe; Tahei Morisawa, Matsudo, both of Japan

[73] Assignee: Asahi Kogaku Kogyo Kabushiki Kaisha, Tokyo, Japan

[21] Appl. No.: 112,689

[22] Filed: Jan. 17, 1980

[30] Foreign Application Priority Data

Feb. 23, 1979 [JP] Japan .............................. 54/22511[U]

[51] Int. Cl.³ .......................... G03B 7/08; G03B 17/20
[52] U.S. Cl. ....................................... 354/289; 354/38
[58] Field of Search .................................. 354/289, 38

[56] References Cited

U.S. PATENT DOCUMENTS

| | | | |
|---|---|---|---|
| 3,882,511 | 5/1975 | Tsujimoto et al. | 354/38 X |
| 4,037,235 | 7/1977 | Ueda | 354/38 |
| 4,089,014 | 5/1978 | Ueda et al. | 354/38 |
| 4,173,404 | 11/1979 | Akasaka | 354/289 |

*Primary Examiner*—Donald A. Griffin
*Attorney, Agent, or Firm*—Sughrue, Rothwell, Mion, Zinn and Macpeak

[57] ABSTRACT

A camera having an automatic exposure control mechanism wherein aperture priority, shutter speed priority and manual modes of operation can be set without the possibility of the switching mechanism being set to inoperable positions. The aperture ring of the camera lens is provided with a protrusion which interlocks with a corresponding protrusion on a ring of the camera body through which aperture information is transmitted. The shutter dial of the camera is provided on its reverse side with plural semicircular conductive pads which selectively engage with contact brushes as the dial is rotated to set the various modes of operation. A variable resistance contact portion is also provided on the dial for manually setting the shutter speed.

4 Claims, 10 Drawing Figures

FIG. 10

| SHUTTER DIAL / APERTURE RING | AUTO | SHUTTER PRIORITY | MANUAL |
|---|---|---|---|
| A | PROGRAM SHUTTER APERTURE CONTROL MODE | SHUTTER-SPEED -PRIORITY AUTOMATIC EXPOSURE CONTROL MODE | MANUAL EXPOSURE CONTROL MODE |
| ALL EXCEPT A | APERTURE-PRIORITY AUTOMATIC EXPOSURE CONTROL MODE | MANUAL EXPOSURE CONTROL MODE | MANUAL EXPOSURE CONTROL MODE |

THREE OPERATIONAL MODE CAMERA

BACKGROUND OF THE INVENTION

This invention relates to mode indication and shutter speed indication device in a camera having both an automatic exposure control for both aperture-priority and shutter-speed-priority and a manual exposure control mechanism.

Heretofore, for shutter-speed-priority automatic exposure control, the aperture ring of the lens was set to the minimum aperture value or a position adjacent thereto indicating "automatic aperture and exposure control", a shutter speed value selected by the photographer was set and a stop operation suitable for the shutter speed value thus set was automatically controlled by the camera. On the other hand, for aperture-priority automatic exposure control, the shutter dial was set to the automatic exposure position, an aperture value selected by the photographer was set and a shutter speed suitable for the aperture value thus set was controlled by the camera. In a camera having a single automatic exposure control mechanism as described above, it was possible merely to switch between automatic and manual photographing modes and accordingly there was no opportunity to make a mistake in switching between the photographing modes.

However, in a camera having both a shutter-speed-priority automatic exposure control mechanism and an aperture-priority automatic exposure control mechanism, it is necessary to switch between a shutter-speed-priority automatic exposure mode, an aperture-priority automatic exposure mode and a manual exposure mode. Accordingly, it is necessary for such a camera to provide a photographing mode switching member in addition to an aperture setting ring and a shutter speed setting dial. Thus, the camera suffers from drawbacks in that the photographer may operate the camera erroneously by setting the operating members to improper combinations of position. It is rather difficult for the photographer to instantly detect the presently set photographing mode from the settings of the operating members.

This will become more apparent from FIG. 1 which shows a camera having an aperture setting ring, a shutter speed setting dial 3, and a photographing mode switching member 4. In performing a photographing operation according to the shutter-speed-priority automatic exposure system with the camera shown in FIG. 1, the mode switching member 4 is set to mark "A-AUTO", the aperture ring 2 is set to mark "A", and the shutter dial 3 is set to a desired shutter speed. That is, in this case, three operating members are operated before the photographing operation which is undoubtedly inconvenient in the case where photographing must be achieved quickly. If, in the setting of the above-described operating members, the aperture ring 2 were set to positions other than the mark "A", the setting of the aperture ring would be inconsistent with the settings of the other operating members. It is desirable that this possibility be eliminated. Furthermore, in the case where the aperture ring 2 is set to the mark "A" and the shutter dial 3 is set to mark "B" (bulb), it cannot be readily determined which one of the aperture-priority automatic exposure control and shutter-speed-priority automatic exposure control takes precedence over the other.

In addition, in the case of aperture-priority automatic exposure, it is necessary to set the mode switching member 4 to mark "S-AUTO", the aperture ring 2 to a desired aperture value, and the shutter dial 3 to "automatic". In this case, automatic exposure can be effected independently of the setting of the shutter dial 3. However, when the aperture ring 2 is set to the mark "A", it is not possible to independently set the aperture value. These difficulties in operating the device are due to the fact that the camera has a number of operating members and indicating members.

Accordingly, an object of the invention is to provide a device in which the settings of the above-described operating members are consistent with one another regardless of what settings are employed and the photographer can readily determine the contents of the settings.

SUMMARY OF THE INVENTION

These, as well as other objects of the invention, are met by a camera including an automatic exposure control mechanism for aperture-priority and shutter-speed-priority and a manual exposure control mechanism for manually setting an aperture value and a shutter speed including a three-photographing mode switching means, that is, a switching means capable of operating in the three primary photographing modes, and having an indication member operated in association with a photographing mode switching member. The indication member as a series of control regions formed as semi-circular contact areas including an aperture-priority automatic exposure control region, a shutter-speed-priority automatic exposure control region divided into parts corresponding to available shutter speed values, and a manual exposure region divided into parts corresponding to the available shutter speed values. The manual exposure region confronts a stationary index means so that the camera may be set to an operational mode corresponding to an indication produced by continuous displacements of the photographing mode switching member.

BRIEF DESCRIPTION OF THE DRAWINGS

FIG. 10 is a table indicating various combinations of settings of the shutter dial and the aperture ring.

DESCRIPTION OF THE PREFERRED EMBODIMENTS

Figure 5:
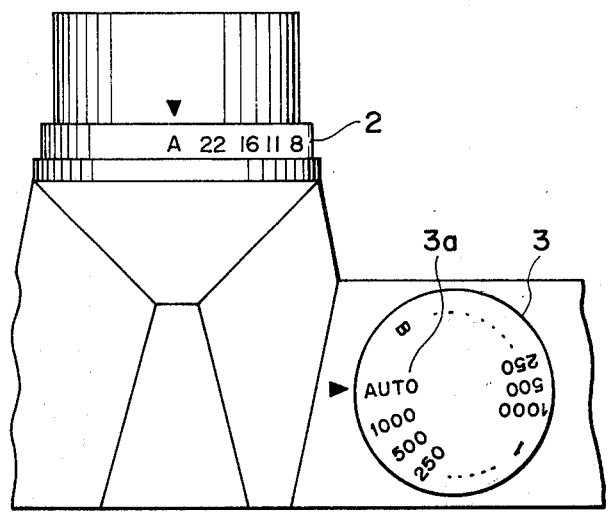
Figure 6:
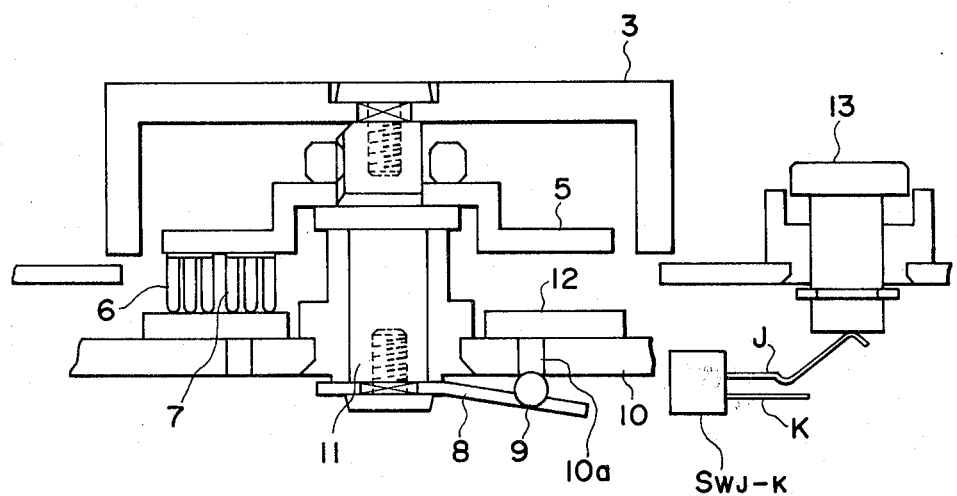
FIG. 6 is a sectional view of the shutter dial and the shutter button of a camera according to the invention.
Figure 8:
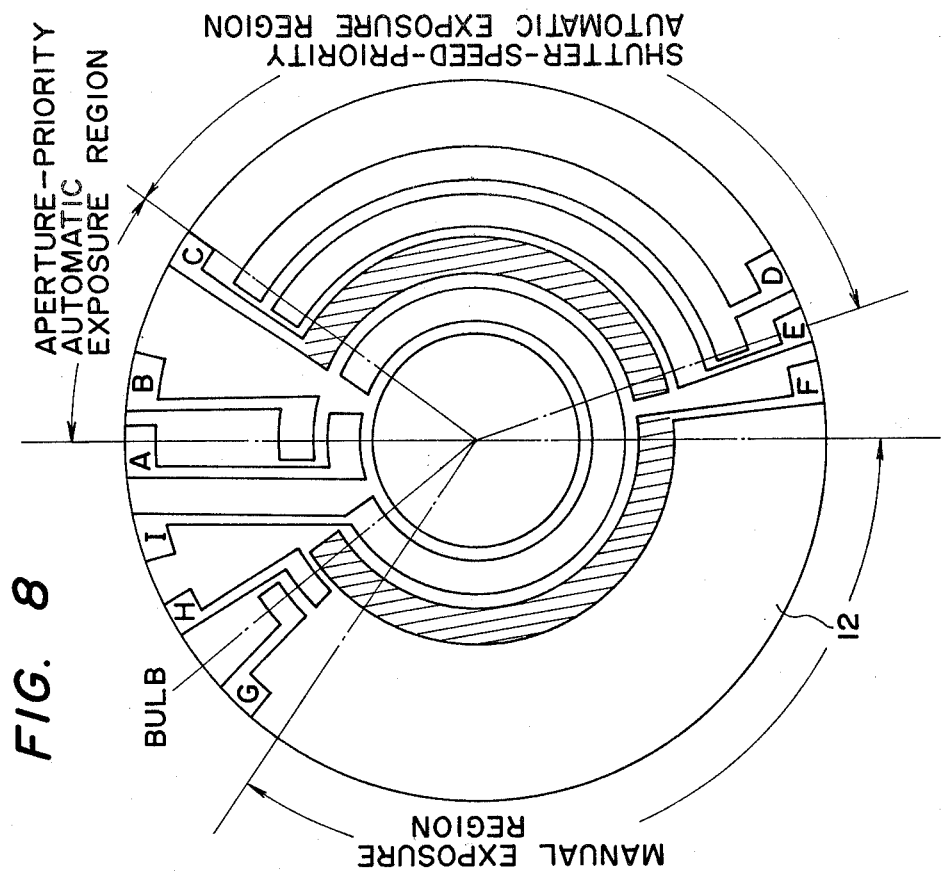
FIG. 8 is a plan view showing an electrical pattern provided on a shutter dial according to the invention.
Figure 7:
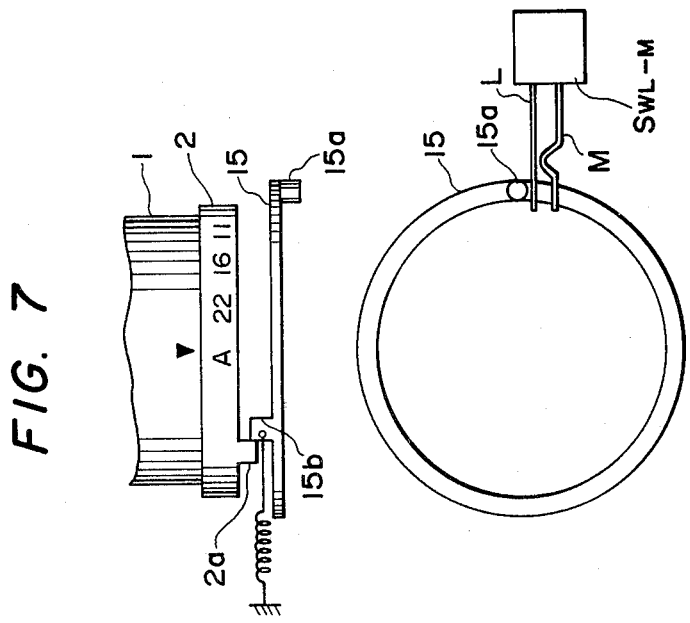
FIG. 7 is an explanatory diagram showing a mechanism for transmitting the operational movement of the aperture ring to the camera body.
Figure 9:
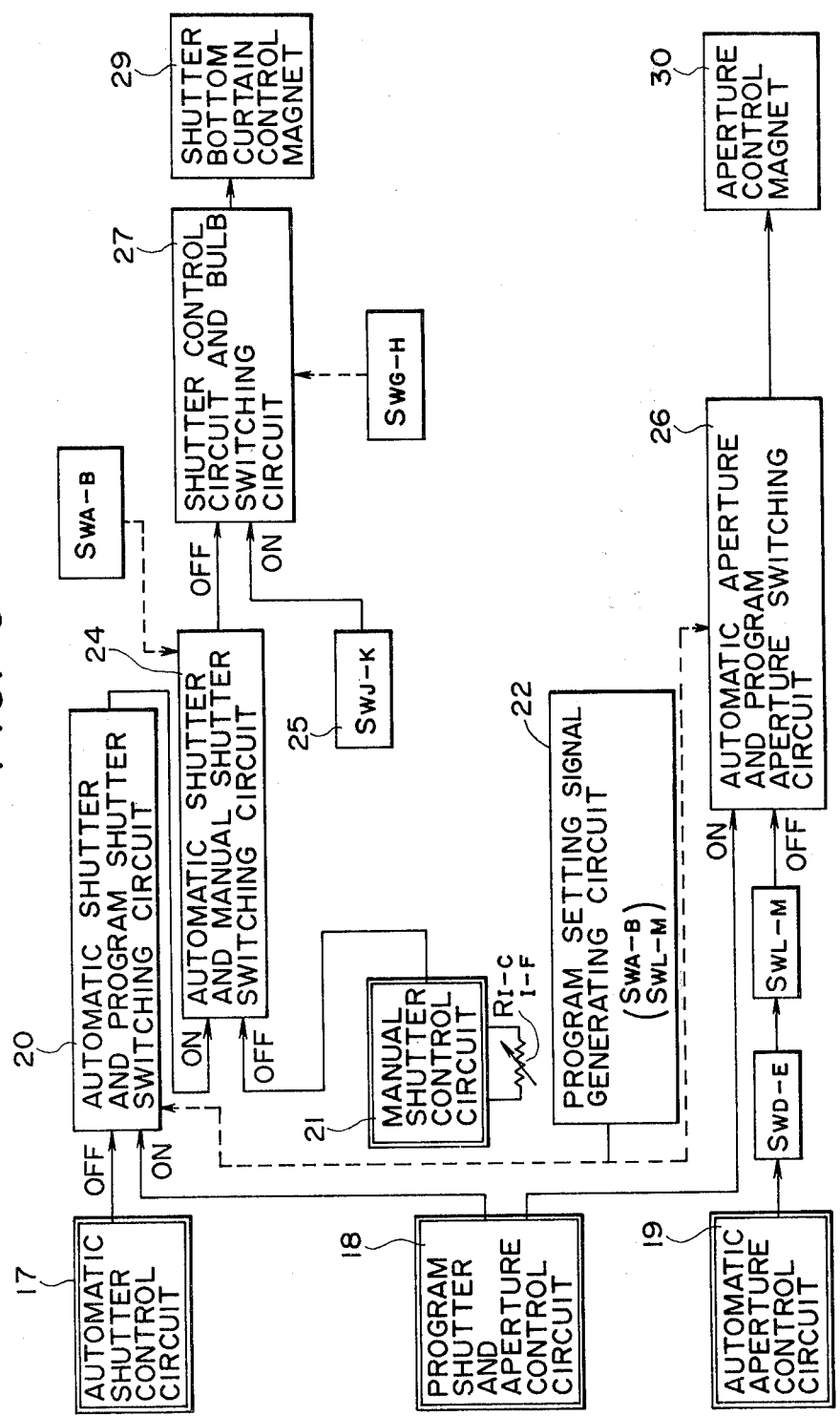
FIG. 9 is a block diagram showing a drive circuit of the camera according to the invention.

FIGS. 2 through 5 show a camera in various photographing modes provided by combining the settings of the shutter dial and the aperture ring. FIG. 6 is a sectional view showing a shutter dial and a shutter button according to the invention. In these figures, a photographing mode switching member and an indicating member are provided as a single unit. FIG. 7 shows a mechanism and a switch for transmitting a swtiching action to "AUTO" from the aperture ring of the lens to the camera. FIG. 8 is a plan view of a pattern showing mode change-over switches and a variable resistor for manual shutter control. FIG. 9 is a block diagram showing a drive circuit of a camera according to the invention. FIG. 10 is a table indicating various photographing modes provided by combining the settings of the shutter dial and the aperture ring.

As shown in FIG. 6, a click spring 8 positioned in the rotational direction, a brush mounting plate 5 on which two insulated brushes 6 and 7 are provided parallel to each other, and a shutter dial 3 forming a photographing mode switching member and on which photographing modes and shutter speeds are indicated as shown in FIGS. 2 through 5 are fixedly mounted on a shutter dial shaft 11. A steel ball 9 is positioned in a depression in the click spring 8. A shutter seat plate 10 is provided with twenty-four clicking holes 10a for "AUTO", shutter-priority automatic exposure time data "1000" to "1", manual exposure time data "1000" to "1" and "B". A shutter button 13 has a switch $S_{WJ-K}$ which is operated in association with the shutter button. Specifically, the switch is turned on when the shutter button 13 is depressed and is turned off when the shutter button 13 is released.

In order to transmit information from the aperture ring 2 of the lens 1 to a lens A-M change-over switch $S_{WL-M}$ on the camera, the aperture ring 2 is provided with a protrusion 2a while an interlocking ring 15 on the camera body is provided with a protrusion 15b and a dowel 15a, as shown in FIG. 7. When the protrusion 2a abuts against the protrusion 2b, the information is transferred to the switch $S_{WL-M}$. The lens A-M change-over switch $S_{WL-M}$ is arranged so that it is turned on by the dowel 15a of the interlocking ring 15 with the aperture ring 2 set to the mark "A".

Figure 3:
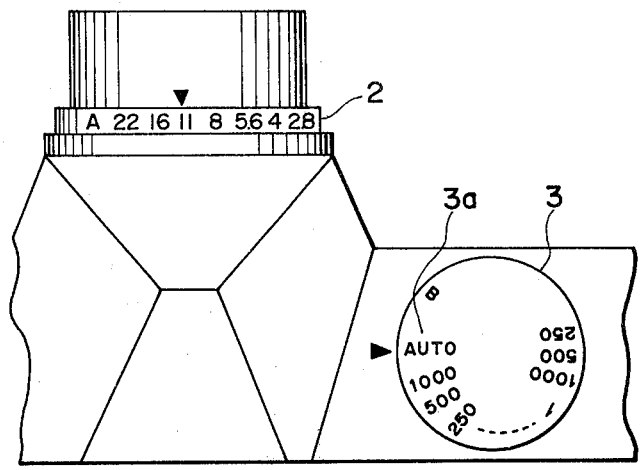
Figure 4:
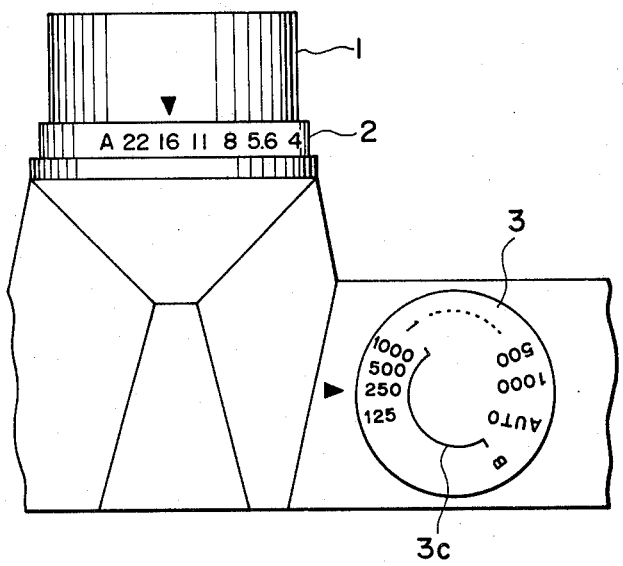

All the modes of the shutter dial will be described with reference to the pattern shown in FIG. 8 and the block diagram shown in FIG. 9. When the brushes 6 and 7 are positioned for the aperture-priority automatic exposure, that is, when the shutter dial 3 is set to mark "AUTO", a switch $S_{WA-B}$ formed with the lands A and B is turned on. As a result, an automatic shutter and manual shutter switching circuit 24 is set to the automatic shutter position and therefore, when the aperture ring 2 is set for manual aperture as shown in FIG. 3, the aperture-priority exposure mode is activated. When, under this condition the aperture ring 2 is set to the mark "A" with the shutter dial 3 maintained set to the mark "AUTO" as shown in FIG. 5 then, with the aid of the operation of a program setting signal generating circuit 22 including the switching $S_{WA-B}$ and $S_{WL-M}$, an automatic shutter and program shutter switching circuit 20 and an automatic aperture and program aperture switching circuit 26 operate a program shutter and aperture control circuit 18 whereby a shutter bottom curtain control magnet 29 and an aperture control magnet 30 are controlled for program shutter operation.

Figure 1:
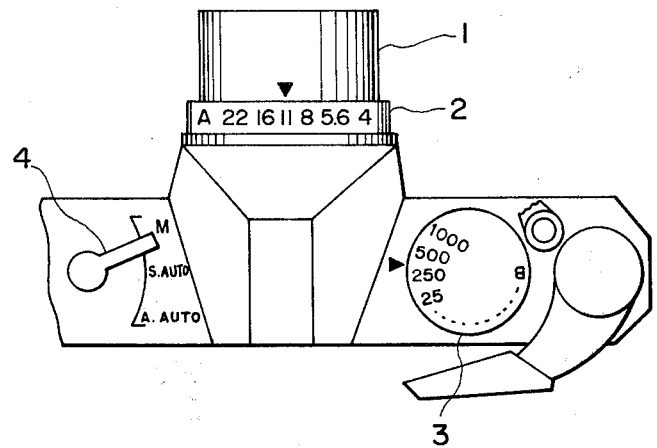
FIG. 1 is a top view of a camera in which the aperture ring, the shutter dial and the mode switching member are provided separately.
Figure 2:
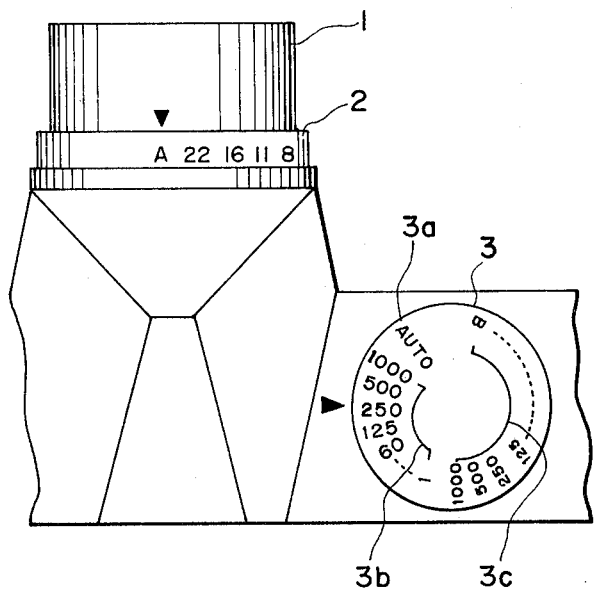
FIG. 2 through FIG. 5 are top views of a camera according to the invention showing various modes of a shutter dial and an aperture ring thereof.

When the brushes 6 and 7 reach a shutter-speed-priority automatic exposure region, the switch $S_{WA-B}$ formed with the lands A and B is turned off. As a result, the automatic shutter and manual shutter switching circuit 24 operates a manual shutter control circuit 21. The resistance of a variable resistor for defining the time data for manual shutter operation is provided between the lands I and C on the pattern 12. This is provided and detected over a resistance ratio range of 1/1000 to 1. If, in this operation, a switch $S_{WD-E}$ formed with the lands D and E is maintained turned on and the aperture ring 2 is maintained at the mark "A" as shown in FIG. 2, the switch $S_{WL-M}$ is turned on and an automatic aperture control circuit 19 is therefore operated. Thus, shutter-speed-priority automatic exposure has been provided.

If, under this condition, the aperture ring 2 which has been set to the mark "A" is moved, namely the aperture ring 2 is set for manual stop, then the automatic aperture control circuit 19 is not operated and the aperture is stopped down to an aperture value indicated. Thus, the manual stop and the manual shutter may be set for manual exposure.

When the brushes 6 and 7 are further turned to the manual exposure region, the manual shutter control circuit 21 is operated with the switch $S_{WA-B}$ maintained in the off position. As the switch $S_{WD-E}$ remains turned off, the automatic aperture control circuit is not operated. Thus, complete manual exposure is provided for. In this case, usually the aperture ring 2 is set for manual stop. However, even if the aperture ring 2 is set to the mark "A", the automatic aperture control circuit 19 is not operated and the lens is stopped down to the minimum aperture value as long as the switch $S_{WD-E}$ is maintained turned off.

When the brushes 6 and 7 are turned to the bulb region, then a switch $S_{WD-H}$ formed with the lands G and H of the pattern 12 is turned on, a shutter control circuit and bulb switching circuit 27 is operated and the shutter bottom curtain control magnet 29 is controlled by a switch 25 $S_{WJ-K}$ operated in association with the release button 13 as shown in FIG. 9. More specifically, the switch $S_{WJ-K}$ is turned on by the first stroke of the release button 13 as a result of which current is applied to the shutter button control magnet 29. Thereafter the top curtain runs and the release button 13 is released whereupon the switch $S_{WJ-K}$ is turned off and the application of current to the shutter bottom curtain control magnet 29 is suspended. The bottom curtain is therefore run, thus completing the exposure.

As is clear from the above description, there are six combinations for setting the shutter dial and the aperture ring as indicated in FIG. 10. However, the number of control modes is only four: the program shutter aperture control mode, the shutter-speed-priority automatic exposure control mode, the aperture-priority automatic exposure control mode and the manual exposure control mode. Thus, according to the invention, whatever the settings of the shutter dial and the aperture ring may be, they are consistent with each other at all times and the above-described delay for verifying the settings before taking pictures is eliminated. The data indications on a camera, which have been provided in various forms, can be remarkably simplified. Thus, the camera according to the invention is designed to be convenient for the photographer while yet the camera is simple in construction and high in reliability.

What is claimed is:

1. A camera including an automatic exposure control mechanism for aperture-priority and shutter-speed-priority and a manual exposure control mechanism for manually setting an aperture value and a shutter speed comprising: a three-photographing mode switching means having an indication member operated in association with a photographing mode switching member, said indication member having a series of control regions including an aperture-priority automatic exposure control region, a shutter-speed-priority automatic exposure control region divided into parts corresponding to available shutter speed values, and a manual exposure region divided into parts corresponding to said available shutter speed values, said manual exposure region confronting a stationary index means so that said camera is set in an operational mode corresponding to an indication obtained by continuous displacement of said photographing mode switching member.

2. The camera of claim 1 wherein said manual exposure region comprises a resistance member for providing different resistance values indicative of different shutter speeds.

3. The camera of claim 1 wherein said indication member comprises a rotatable disc-shaped member.

4. The camera of claim 3 further comprising means for stopping rotation of said disc-shaped member at predetermined rotational positions.

* * * * *